United States Patent
Covalucci et al.

(10) Patent No.: US 12,542,667 B2
(45) Date of Patent: Feb. 3, 2026

(54) SYSTEMS AND METHODS FOR MODIFYING CRYPTOGRAPHIC TOKEN RELATED DATA

(71) Applicant: Capital One Services, LLC, McLean, VA (US)

(72) Inventors: Christopher Vito Covalucci, Herndon, VA (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 428 days.

(21) Appl. No.: 18/169,030

(22) Filed: Feb. 14, 2023

(65) Prior Publication Data

US 2024/0275597 A1    Aug. 15, 2024

(51) Int. Cl.
*H04L 9/32* (2006.01)
*H04L 9/30* (2006.01)

(52) U.S. Cl.
CPC .............. *H04L 9/3213* (2013.01); *H04L 9/30* (2013.01); *H04L 9/3247* (2013.01)

(58) Field of Classification Search
CPC ....... H04L 9/30; H04L 9/3213; H04L 9/3239; H04L 9/3247; H04L 9/50
See application file for complete search history.

(56) References Cited

U.S. PATENT DOCUMENTS

| | | | | |
|---|---|---|---|---|
| 12,321,924 B1* | 6/2025 | Kurani | ............... | G06Q 40/04 |
| 2023/0214128 A1* | 7/2023 | Srivastava | ......... | G06F 16/2365 |
| | | | | 711/162 |
| 2025/0184163 A1* | 6/2025 | Rakic | ................ | G06F 16/9024 |

OTHER PUBLICATIONS

R. Akkaoui, X. Hei and W. Cheng, "EdgeMediChain: A Hybrid Edge Blockchain-Based Framework for Health Data Exchange," in IEEE Access, vol. 8, pp. 113467-113486 (IEEE 2020) (Year: 2020).*

G. Ateniese, R. Pietro, L. Mancini, Scalable and efficient provable data possession, Proceedings of the 4th international conference on security and privacy in communication networks, 9 (ACM 2008) (Year: 2008).*

Jayapriya Jayabalan, N. Jeyanthi, Scalable blockchain model using off-chain IPFS storage for healthcare data security and privacy, Journal of Parallel and Distributed Computing, vol. 164, pp. 152-167, ScienceDirect (2022) (Year: 2022).*

(Continued)

*Primary Examiner* — Theodore C Parsons
(74) *Attorney, Agent, or Firm* — Foley & Lardner LLP

(57) ABSTRACT

Systems and methods for modifying cryptographic token related data. In some aspects, the system accesses a unique cryptographic token associated with a user. The token is associated with a digital asset and is encrypted using a public key for the user. The system receives a request from the user to allow a third-party server to modify the asset. The request includes a public key for the third-party server. The system obtains and decrypts the asset using a private key for the user. The system encrypts the asset using the public key for the third-party server and transmits the asset and the public key for the user to the third-party server. The system receives, from the third-party server, an updated digital asset encrypted using the public key for the user. The system decrypts the updated asset using the private key for the user and replaces the asset with the updated asset.

20 Claims, 5 Drawing Sheets

(56) References Cited

OTHER PUBLICATIONS

Ken Miyachi, Tim K. Mackey, hOCBS: A privacy-preserving blockchain framework for healthcare data leveraging an on-chain and off-chain system design, Information Processing & Management, vol. 58, Issue 3, 102535 (Science Direct 2021) (Year: 2021).*

* cited by examiner

SYSTEMS AND METHODS FOR MODIFYING CRYPTOGRAPHIC TOKEN RELATED DATA

SUMMARY

Methods and systems are described herein for novel uses and/or improvements to blockchain technology. As one example, methods and systems are described herein for allowing multiple parties to update a digital asset associated with a unique cryptographic token which may be helpful in instances where the unique cryptographic token serves as a dynamic record. A dynamic record may include information related to the owner of the cryptographic token and may need to be updated periodically. For example, updating the digital asset associated with the cryptographic token may include adding, modifying, or deleting information stored in the digital asset associated with the cryptographic token. Allowing multiple parties to update the same unique cryptographic token may be helpful in instances, e.g., where an official record needs to be accessible by multiple individuals but only edited by authorized parties. As yet another example, allowing multiple parties to update the same unique cryptographic token may be helpful in instances where an official record needs to be consulted and the consultation relies on the integrity of the data; by storing the record on a blockchain the integrity of the data can be ensured and non-repudiation is ensured.

Existing systems fail to allow the modification of a unique cryptographic token by a third party. Specifically, unique cryptographic tokens are designed to be nonfungible and immutable. Allowing modification of the digital asset associated with a unique cryptographic token by a third party one or more times allows for an alterable form of a unique cryptographic token. Ensuring that the token has a unique ID preserves the non-fungibility of the unique cryptographic token irrespective of any changes or updates performed by the third party. For example, existing systems do not allow modification of unique cryptographic tokens without destroying the original unique cryptographic token and generating a new one. However, the difficulty in blockchain technology for this practical benefit faces several technical challenges such as how to allow the modification of a unique cryptographic token by a third party without compromising confidentiality or data integrity.

To overcome these technical deficiencies in adapting blockchain technology for this practical benefit, methods and systems disclosed herein may obtain an updated record from a third party to replace an original record associated with a unique cryptographic token. In some embodiments, methods and systems disclosed herein receive, from a third-party server, an updated digital asset, encrypted using a public key for a user, and transmit the updated digital asset to a management server to replace a digital asset linked by the unique cryptographic token with the updated digital asset. For example, the digital asset pointed to by the unique cryptographic token can be updated through the use of the third-party server and asymmetric encryption, thereby updating the unique cryptographic token. This provides a solution to the problem of how to update a unique cryptographic token and expands the options for use cases of unique cryptographic tokens.

Accordingly, the methods and systems provide the benefit of allowing multiple parties to update the same unique cryptographic token which may be helpful in instances where the unique cryptographic token serves as a dynamic record. Specifically, by allowing more than one party to update the same data associated with a unique cryptographic token it allows all parties involved to reap the benefits of blockchain and avoid complications of traditional record-keeping methods. In particular, all parties are assured of the accuracy of the record timeline as the blockchain is immutable. Additionally, there is no single entity required to maintain the record, it is a distributed system that benefits all involved parties. Finally, traditional record-keeping methods are subject to a reliance on trusted sources for historical information, blockchain alleviates this by providing an accurate and verified historical account of the digital asset.

Conventionally, unique cryptographic tokens are immutable. In some use cases, it would be beneficial and desirable to allow a unique cryptographic token to be updated or changed by a third party. The use of a management server and asymmetric encryption solves the problem of a lack of immutability in certain use cases for unique cryptographic tokens. For example, if a unique cryptographic token is minted to represent data on behalf of a user, the unique cryptographic token may need to be updated as the user's data changes over time. The system may selectively restrict or modify certain digital assets associated with the unique cryptographic token to allow a user access to non-confidential portions of the unique cryptographic token while maintaining the confidentiality of other portions of the unique cryptographic token. In another example, the system may restrict access to certain portions of the unique cryptographic token based on a sensitivity rating of the data pointed to by the unique cryptographic token.

In some aspects, the system may access a unique cryptographic token associated with a user. The unique cryptographic token may include a link to a digital asset stored at a management server. The digital asset may be encrypted using a public key for the user. After accessing the unique cryptographic token associated with the user, the system may receive a request from the user to allow a third-party server to modify the digital asset linked by the unique cryptographic token. The request may include a public key for the third-party server. After the system receives a request from the user to allow a third-party server to modify the digital asset, the system may obtain the digital asset from the management server and decrypt the digital asset using a private key for the user.

After obtaining the digital asset, the system may encrypt the digital asset using the public key for the third-party server and transmit the digital asset and the public key for the user to the third-party server. This may ensure that the third-party server has access to the confidential records while never allowing the data in transit to be in plaintext. By ensuring the availability and confidentiality of the human resource records both the user and the third-party server can be assured of the authenticity of the record. After the system transmits the encrypted digital asset to the third-party server, the system may receive, from the third-party server, an updated digital asset, wherein the digital asset has been encrypted using the public key for the user.

After the system receives an updated digital asset, the system may decrypt the updated digital asset using the private key for the user and validate the updated digital asset with respect to a format for the digital asset. To ensure there are no compatibility or readability issues, the system may decrypt the digital asset to ensure that various formatting requirements are intact. After the system decrypts the updated digital asset, the system may, in response to the validating being successful, transmit the updated digital asset to the management server to replace the digital asset linked by the unique cryptographic token. For example, after the system verifies the formatting and content of the updated digital asset comport with the expected input the system may transmit the verified and updated digital asset to the management server where it will replace the current digital asset.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
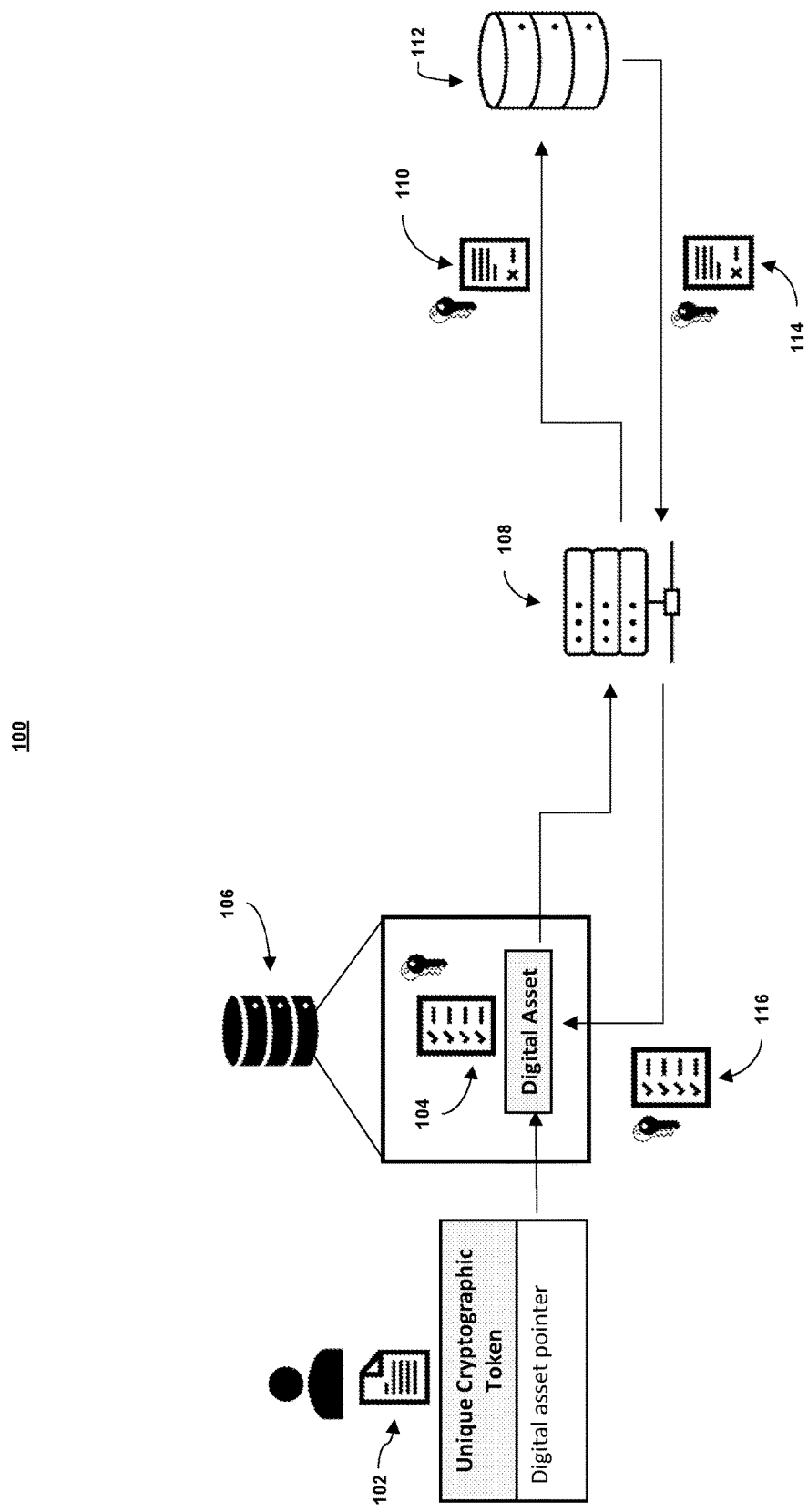
FIG. 1 shows an illustrative overview of a system for enabling modification of a digital asset associated with a unique cryptographic token, in accordance with one or more embodiments.

FIG. 1 shows an illustrative overview of the system for allowing multiple parties to update the same unique cryptographic token, in accordance with one or more embodiments. For example, system 100 for allowing multiple parties to update the same unique cryptographic token may include system server 108, management server 106, and third-party server 112. Management server 106 may store digital asset 104. To access the digital asset, parties can refer to the metadata of unique cryptographic token 102. System server 108 may be responsible for coordinating the updating process for digital asset 104, pointed to by unique cryptographic token 102. To update unique cryptographic token 102, system server 108 receives a request from a user requesting the system to allow third-party server 112 to modify digital asset 104. System server 108 may obtain digital asset 104 from management server 106 and decrypt it using the user's private key. System server 108 may encrypt digital asset 104 using the third-party server's public key. Additionally, system 100 may include third-party server 112. System server 108 may transmit the encrypted digital asset 110 to the third-party server. Third-party server 112 may be responsible for updating encrypted digital asset 110 associated with unique cryptographic token 102. In some embodiments, third-party server 112, management server 106, and system server 108 may be configured on one or more user devices (e.g., a laptop computer, a smartphone, a desktop computer, an electronic tablet, or another suitable user device). Once third-party server 112 makes the modifications to encrypted digital asset 110, it encrypts updated digital asset 114 using the user's public key prior to transmission back to system server 108. After receiving updated digital asset 114, the system server may validate updated digital asset 114 and transmit validated digital asset 116 to the management server to replace digital asset 104.

Management server 106, system server 108, and third-party server 112 are components that may allow multiple parties to update the same unique cryptographic token (e.g., unique cryptographic token 102) which may be helpful in instances where the unique cryptographic token serves as an official dynamic record by being correlated with a digital asset serving as the record (e.g., digital asset 104). Instances where the same unique cryptographic token may serve as an official dynamic record may include decentralized autonomous organizations (DAOs). Another instance where a unique cryptographic token would serve as the official dynamic record may be in industries that deal with highly classified and sensitive data that necessitate robust and confidential record keeping. Industries that deal with highly classified and sensitive data that necessitate robust and confidential record-keeping may include healthcare, government, legal, finance and business.

For example, FIG. 1 illustrates receiving from a third-party server (e.g., third-party server 112), an updated digital asset (e.g., updated digital asset 114), wherein the digital asset has been encrypted using the public key for the user and transmitting the updated digital asset to a management server (e.g., management server 106) to replace a digital asset linked by the unique cryptographic token (e.g., digital asset 104). For example, using a management server to replace and update the digital asset allows for the modification of a digital asset associated with the unique cryptographic token and overcomes traditional challenges with updating unique cryptographic tokens, such as the immutability of blockchain architecture or high costs associated with modifying a unique cryptographic token or transferring ownership of the unique cryptographic token to an inaccessible wallet ID. As such, the system may allow multiple parties to update the same unique cryptographic token which may be helpful in instances where the unique cryptographic token serves as an official dynamic record.

The system may be used to allow multiple parties to modify the same digital asset. In some embodiments, a digital asset may refer to anything that can be stored and transmitted electronically through a computer or other digital device and that is associated with ownership or use rights. The digital asset may comprise a human resources file, an employment record, a medical record, or a financial record. In some embodiments, the digital asset may comprise a digital file that needs to be periodically updated by one or more parties. The digital asset may also need to be accessed by one or more parties. The digital asset can be stored on a single server. The digital asset can also be stored across multiple servers either in part or in whole for redundancy. In some embodiments, the digital asset may comprise media including a video, music, audio recording, photo, or document. The digital asset may be downloaded periodically to track changes made to the digital asset.

The system may be used to validate the format of a digital asset that has been modified by one or more parties. In some embodiments, validating the format of a digital asset may include comparing modifications of a digital asset to a set of formatting guidelines—the formatting rules to follow when updating a digital asset. For example, the formatting guidelines may comprise a guideline specifying the order and length of a date that must be entered. The formatting guidelines may comprise a guideline specifying email requirements such as threshold values associated with detecting fake email addresses. The formatting guidelines may comprise address verification measures which may include querying an external application programming interface ("API") to ensure the validity of an address entered.

The system may be used to allow a third party to modify data pointed to by a unique cryptographic token one or more times. In some embodiments, a unique cryptographic token (e.g., a nonfungible token) may include a unique digital identifier that is immutable and that is recorded in a blockchain. In some embodiments, the unique cryptographic token is stored in a blockchain with information about the owner of the unique cryptographic token. The owner associated with the unique cryptographic token has certain privileges pertaining to the unique cryptographic token. The privileges associated with ownership include the ability to transfer the unique cryptographic token to another entity or to sell or trade the unique cryptographic token. In some embodiments, the unique cryptographic token may comprise metadata. The metadata stored in a unique cryptographic token may include token properties such as name, supply, transaction history, traits, or link to the hosted image. Metadata stored in the unique cryptographic token may be represented using JavaScript Object Notation ("JSON").

The system may be used to request changes to a digital asset through the use of a user input interface. In some embodiments, a user input interface may comprise a human-computer interaction and communication in a device, and may include display screens, keyboards, a mouse, and the appearance of a desktop. For example, a user input interface may comprise a way a user interacts with an application or a website. Furthermore, a user input interface may capture interactions between the user and the interface such as clicks, taps, photographs, audio recording, text input, joystick movements, eye movements, or other input methods.

The system may be used to display a digital asset on a user output interface. In some embodiments, a user output interface may comprise a human-computer interaction and communication in a device, and may include display screens, keyboards, a mouse, and the appearance of a desktop. For example, a user output interface may comprise a user interface element designed to be displayed to the user. For example, the user interface element may be a string, a photograph, a video, or other graphically represented data.

The system may transmit content pertinent to the unique cryptographic token or the corresponding digital asset. In some embodiments, content may be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another but consumed and/or published by the user.

Figure 2:
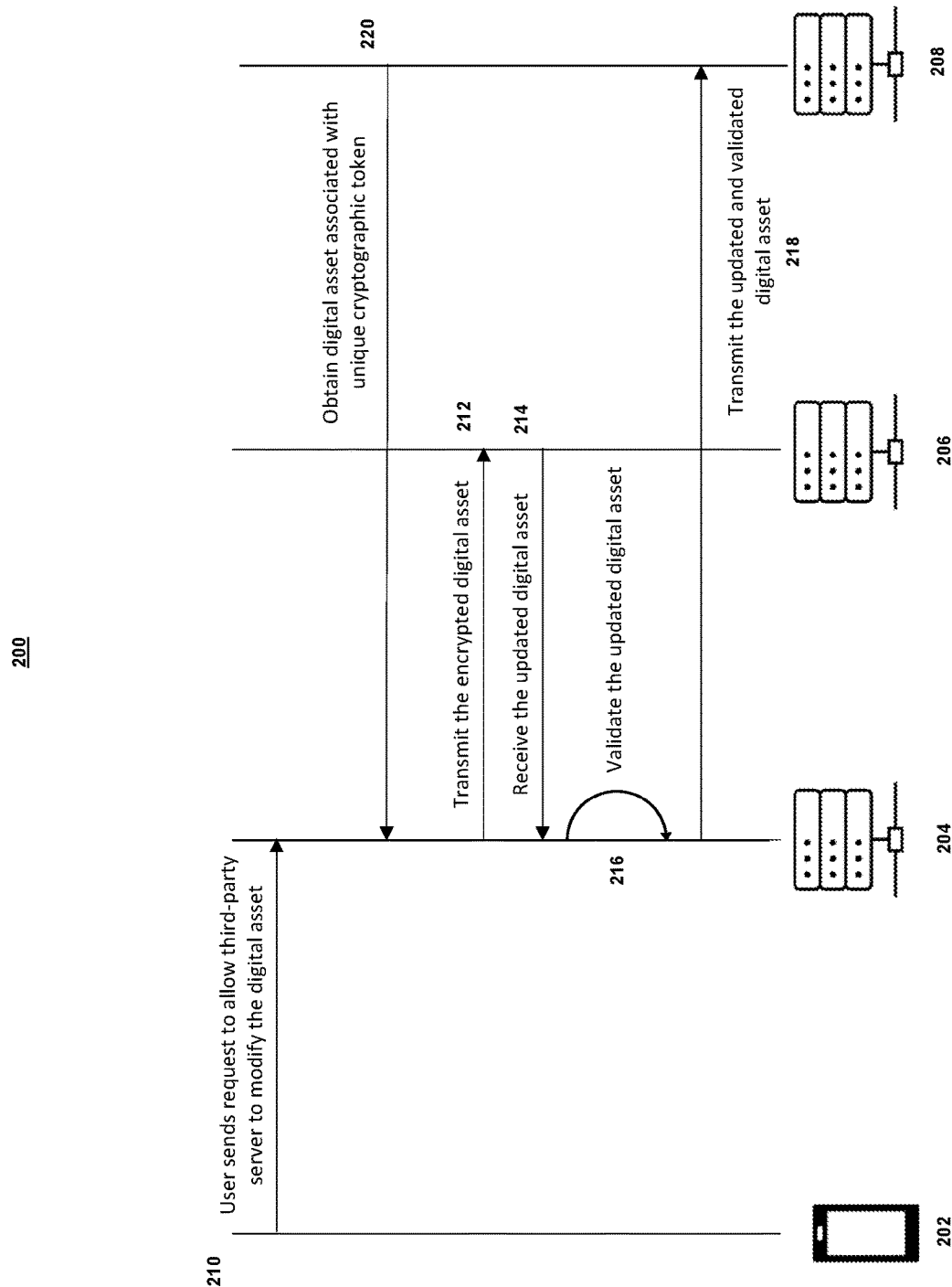
FIG. 2 shows an illustrative data flow diagram for enabling modification of a digital asset associated with a unique cryptographic token, in accordance with one or more embodiments.

FIG. 2 shows an illustrative data flow diagram for facilitating the updating and validation of a digital asset associated with a unique cryptographic token, in accordance with one or more embodiments. System 200 may include system server 204 and may facilitate the update of a digital asset correlated with a unique cryptographic token. System server 204 may communicate with management server 208 to receive the current digital asset or to update the digital asset. System server 204 may also communicate with a user device (e.g., user device 202) to receive authorization to make changes to the digital asset or unique cryptographic token. System server 204 may also communicate with a third-party server (e.g., third-party server 206). Communication between system server 204 and third-party server 206 may be to request or receive changes to the digital asset corresponding to the unique cryptographic key. System server 204 may also be responsible for coordinating indirect communications by user device 202 and third-party server 206.

When the user sends a request to the system to allow a third-party server (e.g., third-party server 206) to modify the digital asset (e.g., user request step 210) managed by a server (e.g., management server 208), system server 204 obtains the digital asset associated with a unique cryptographic token from the management server (e.g., obtaining step 220), and system server 204 can then transmit the encrypted digital asset to third-party server 206 (e.g., transmission step 212). For example, the operation may be initiated when a user changes jobs and requests a change from their employer regarding employment status. The operation may alternatively be initiated when a user receives a performance review at a current job. After transmitting the encrypted digital asset, a third party (e.g., third-party server 206) may decrypt and modify the digital asset and transmit it back to the system (e.g., system server 204). The system (e.g., system server 204) may run a validation operation (e.g., validation step 216) to ensure that the modifications conform to a standardized format. For example, the system may use regular expressions to ensure a specific format is followed. The system may compare the modified aspects of the digital asset to a data validation library or use a custom model for ensuring standardization of entered data. After the system verifies the validity of the updated digital asset it may transmit the updated and validated digital asset to management server 208 (e.g., transmission step 218).

By using a management server in conjunction with a system server, the system alleviates challenges in modifying unique cryptographic tokens. Specifically, by storing the digital asset on a management server, the unique cryptographic token can maintain a static link in metadata pointing to a digital asset stored on a management server. By using the static link, the immutability of blockchain does not prevent the modification of the digital asset associated with the unique cryptographic token. Specifically, by receiving, from the third-party server, an updated digital asset, wherein the digital asset has been encrypted using the public key for the user and transmitting the updated digital asset to the management server to replace the digital asset linked by the unique cryptographic token, the system allows the modification of a digital asset associated with a unique cryptographic token which is typically challenging due to the immutable nature of blockchain and the technical complexity associated with modifying or updating a unique cryptographic token.

In some embodiments, when the user sends a request to allow a third-party server to modify the digital asset the request can be made by a user device or an automated process. The request could also leverage an on-chain program (e.g., a smart contract). An on-chain program may be a computer program or any suitable code for performing computing operations. The on-chain program may be stored on a blockchain (e.g., hosted on a blockchain node) and may be executed by the blockchain node. In some cases, the on-chain program may run when predetermined conditions are satisfied. In one example, the on-chain program may be a smart contract deployed on a blockchain. The smart contract may be retrieved and executed by a blockchain node. Thus, the on-chain program may be identified by the blockchain node based on an identifier associated with the cryptographic token. In some embodiments, the on-chain program may be identified in the blockchain operation request.

In some embodiments, the on-chain program may include a trigger that specifies the conditions that must be met to initiate a request to a third party for modification. The trigger may be a request to add an updated resume to an employee's file. This may require a fee to be paid to the management server for managing and storing the digital asset. The on-chain program could specify that once the digital asset is modified funds are to be released to compensate the owner of the management server for managing the digital asset.

In some embodiments, system server 204 may obtain the digital asset associated with a unique cryptographic token from the management server. To retrieve the digital asset from the management server the system server may send a request to the management server over a network, such as the Internet. The request may include the link to the digital asset obtained from the metadata of the unique cryptographic token. Management server 208 may receive the request and identify the corresponding digital asset in an encrypted format. Management server 208 may send the digital asset back to the system server in response.

It is possible that management server 208 does not have the digital asset. Management server 208 may have lost access to the digital asset for reasons including physical damage to the server, corrupted links, accidental file deletion by a human administrator, file system corruption, misconfiguration, network issues, or various hardware failures. If management server 208 cannot find the digital asset pointed to by the unique cryptographic token, it is possible to return nothing to the system server. If the system server cannot find a digital asset corresponding to the unique cryptographic token, the system may query user device 202 for an updated digital asset (e.g., an offline scan of physical employment records, health records, or another physical asset). If the user device can provide an updated digital asset, system server 204 may transmit the updated digital asset to the management server to repair the connection between the unique cryptographic token and the digital asset. If the user device cannot provide an updated digital asset, the system may prompt the user to mint a new cryptographic token and associate a digital asset in the future, once available.

Once the system server is in possession of the current digital asset associated with the unique cryptographic token and managed by the management server, the system server may transmit the encrypted digital asset to the third-party server. The third-party server may make updates to the digital asset. For example, if the digital asset is employment records, the third-party server may be owned by the employee's current company or a new company and changes may include changes to personal information (e.g., name change, address, contact information), job title and responsibilities, compensation information, employee performance reviews, training and development participation, or other employment-related information.

Once the modification to the digital asset is complete, the third-party server may send the digital asset back to the system server. Once the system server receives the digital asset from the third-party server in step 214, a validation process occurs. Data validation is essential to the functioning of this program to preserve data integrity, quality, security, and consistency. Once the updated digital asset is received from the third-party server, the system server initiates a validation process that identifies corrupted, unexpected, or unformatted changes made by the third-party server. Once the offending edits are identified, the system server may use data validation libraries to check standard changes (e.g., addresses, emails, and phone numbers). The system server may use a custom model that specifies constraints to modifications made by third parties (e.g., changes to information from previous employers are not allowed).

To identify corrupted, unexpected, or unformatted changes made by the third-party server the system server may perform syntax or format checking to ensure that a correct structure is followed for entries such as dates, phone numbers, addresses, identification numbers, or emails. The system server may perform range checking to ensure that integers such as age, years worked, or salaries fall within a reasonable range (e.g., unlikely that someone is employed and working at 4 years old, but more likely that someone is employed and working at 40 years old). The system server may perform completeness checking to ensure that all form fields are filled out and information is not overlooked by the third-party server (e.g., if the third-party server does not send a modification to a required field specifying the name of the individual responsible for the changes). The system server may also perform accuracy checking to ensure that the data received from the third-party server is correct.

Accuracy checking performed by the system server may include querying APIs of public or private databases to ensure that information modified in the digital asset is correct. For example, if the digital asset represents health records and a modification to patient history includes a diagnosis of a disease prior to the discovery of that disease it is unlikely to be an accurate modification (e.g., a diagnosis of COVID-19 in January 1993 is not possible). The system may query public health databases or news sources to determine whether the pertinent modification is likely to be accurate (e.g., searching for the keyword "COVID-19" in media outlets).

A custom model that specifies constraints to modifications made by third parties may include restrictions preventing modification to previously entered data. The model may also prevent modification by specific individuals or individuals outside a specific department. The system server may check the content of the modified digital asset to determine who is responsible for the modification and alert or modify the digital asset accordingly (e.g., if an unauthorized user made edits to the digital asset as reflected by a metadata tag indicating who edited the document). Furthermore, the custom model may identify edits made pertaining to information that is not in compliance with local and federal regulations (e.g., storing information for use in hiring about race, color, religion, sex (including gender identity, sexual orientation, and pregnancy), national origin, age, disability, or genetic information).

The system may attempt to fix errors by matching to a standardized format or the system may transmit the digital asset back to the third-party server with a list of format violations that must be amended before the digital asset is accepted. For example, if the job title of an employee is "security analyst," the system server may use a spell-checking model to modify the changes submitted by the third-party server and update the job title of the employee to "security analyst." If the error made by the third-party server is unable to be rectified by the system server, the system server may transmit the digital asset back to the third-party server (e.g., if the start date is 1/1 without a year specified).

In the case where the system server is unable to modify the identified errors to comply with the standard format and modification rules, the system server may redact certain portions of the digital asset or send the digital asset back to the third-party server to fix the errors with the modification. For example, if a performance review contains details about an employee's race, color, religion, sex (including gender identity, sexual orientation, and pregnancy), national origin, age, disability, or genetic information that information may be deleted by the system server and either sent to the management server to replace the current digital asset or back to the third-party server for approval. As another example, the system may send a digital asset back to the third-party server if there are mistakes with the accuracy of the information modified (e.g., the social security number entered by the third-party server does not exist, or the address entered by the third-party server is not valid).

Once the digital asset is validated in validation step 216, the digital asset is transmitted to management server 208 in transmission step 218. The management server may replace the current digital asset with the updated digital asset in the same location. By replacing the digital asset in the same location, the unique cryptographic token's metadata still points to the most up-to-date version of the digital asset. This process allows repeated modification to a digital asset by one or more parties without compromising confidentiality or integrity.

Figure 3:
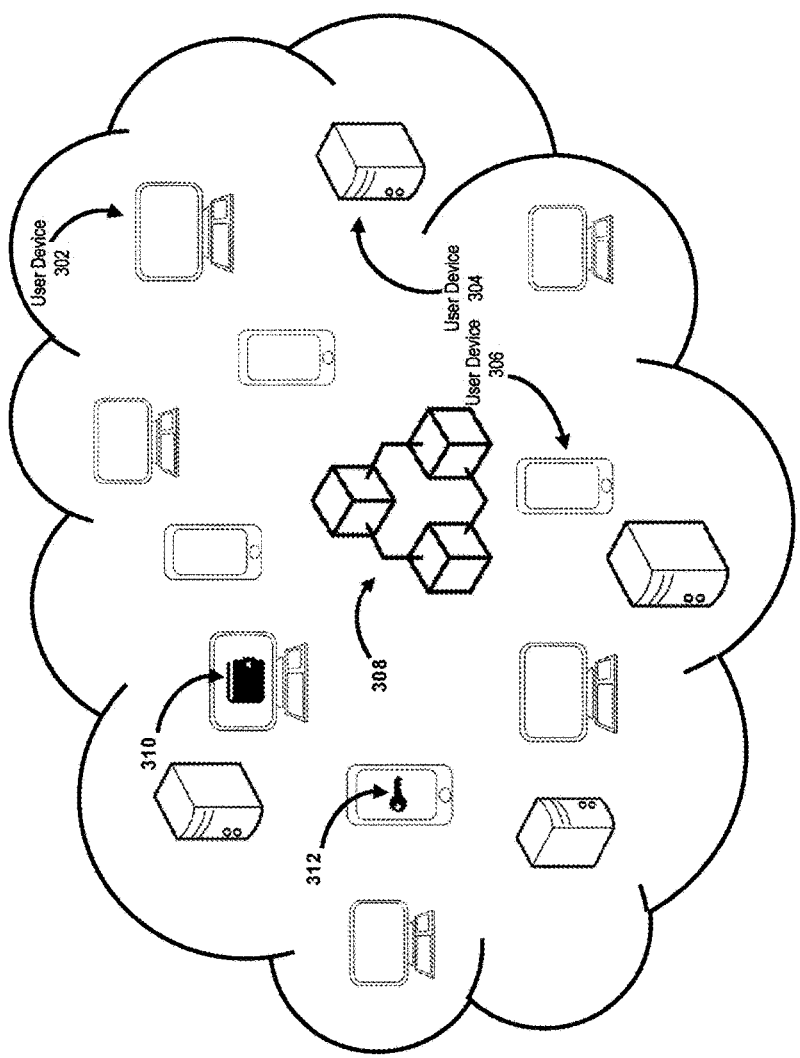
FIG. 3 shows an illustrative diagram for a decentralized environment for performing blockchain functions, in accordance with one or more embodiments.

FIG. 3 shows an illustrative diagram for a decentralized environment for performing blockchain functions, in accordance with one or more embodiments. For example, the diagram presents various components that may be used to enable the modification of a digital asset associated with a unique cryptographic token by one or more third parties in some embodiments.

As shown in FIG. 3, system 300 may include multiple user devices (e.g., user device 302, user device 304, and/or user device 306). For example, system 300 may comprise a distributed state machine, in which each of the components in FIG. 3 act as a client of system 300. For example, system 300 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 300 may interact with, and facilitate the function of, blockchain 308.

It should be noted that, while shown as a smartphone, a personal computer, and a server in FIG. 3, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing system 300 performing a blockchain function may equally be applied to, and correspond to, an individual user device (e.g., user device 302, user device 304, and/or user device 306) performing the blockchain function. That is, system 300 may correspond to the user devices (e.g., user device 302, user device 304, and/or user device 306) collectively or individually.

Each of the user devices may be used by the system to conduct blockchain functions and/or contribute to enabling the modification of a digital asset associated with a unique cryptographic token by one or more third parties. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 3, one or more user devices may include a digital wallet (e.g., digital wallet 310) used to perform blockchain functions. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the Internet while cold wallets are not. Most digital wallet holders hold both a hot wallet and a cold wallet. Hot wallets are most often used to perform blockchain functions, while a cold wallet is generally used for managing a user account and may have no connection to the Internet.

As shown in FIG. 3, one or more user devices may include a private key (e.g., key 312) and/or digital signature. For example, system 300 may use cryptographic systems for conducting blockchain functions such as enabling modification of a digital asset associated with a unique cryptographic token. For example, system 300 may use public-key cryptography, which features a pair of digital keys (e.g., which may comprise strings of data). In such cases, each pair comprises a public key (e.g., which may be public) and a private key (e.g., which may be kept private). System 300 may generate the key pairs using cryptographic algorithms (e.g., featuring one-way functions). System 300 may then encrypt a message (or other blockchain function) using an intended receiver's public key such that the encrypted message may be decrypted only with the receiver's corresponding private key. In some embodiments, system 300 may combine a message with a private key to create a digital signature on the message. For example, the digital signature may be used to verify the authenticity of blockchain functions. As an illustration, when conducting blockchain functions, system 300 may use the digital signature to prove to every node in the system that it is authorized to conduct the blockchain functions.

For example, system 300 may comprise a plurality of nodes for the blockchain network. Each node may correspond to a user device (e.g., user device 302). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 302 may request a blockchain function (e.g., conduct a transaction). The blockchain function may be authenticated by user device 304 and/or another node (e.g., a user device in the community network of system 300). For example, using cryptographic keys, system 300 may identify users and give access to their respective user accounts (e.g., corresponding digital wallets) within system 300. Using private keys (e.g., known only to the respective users) and public keys (e.g., known to the community network), system 300 may create digital signatures to authenticate the users.

Following an authentication of the blockchain function, the blockchain function may be authorized. For example, after the blockchain function is authenticated between the users, system 300 may authorize the blockchain function prior to adding it to the blockchain. System 300 may add the blockchain function to blockchain 308. System 300 may perform this based on a consensus of the user devices within system 300. For example, system 300 may rely on a majority (or other metric) of the nodes in the community network (e.g., user device 302, user device 304, and/or user device 306) to determine that the blockchain function is valid. In response to validation of the block, a node user device (e.g., user device 302, user device 304, and/or user device 306) in the community network (e.g., a miner) may receive a reward (e.g., in a given cryptocurrency) as an incentive for validating the block.

To validate the blockchain function, system 300 may use one or more validation protocols and/or validation (or consensus) mechanisms. For example, system 300 may use a proof-of-work consensus mechanism (POW) in which a user device must provide evidence that it performed computational work to validate a blockchain function, and thus this mechanism provides a manner for achieving consensus in a decentralized manner as well as preventing fraudulent validations. For example, the POW may involve iterations of a hashing algorithm. The user device that is selected to validate must aggregate and record blockchain functions from a mempool (e.g., a collection of all valid blockchain functions waiting to be confirmed by the blockchain network) into the next block. Alternatively or additionally, system 300 may use a proof-of-stake (POS) mechanism in which a user account (e.g., corresponding to a node on the blockchain network) is required to have, or "stake," a predetermined amount of tokens in order for system 300 to recognize it as a validator in the blockchain network.

In response to validation of the block, the block is added to blockchain 308, and the blockchain function is completed. For example, to add the blockchain function to blockchain 308, the successful node (e.g., the successful miner) encapsulates the blockchain function in a new block before transmitting the block throughout system 300.

Figure 4:
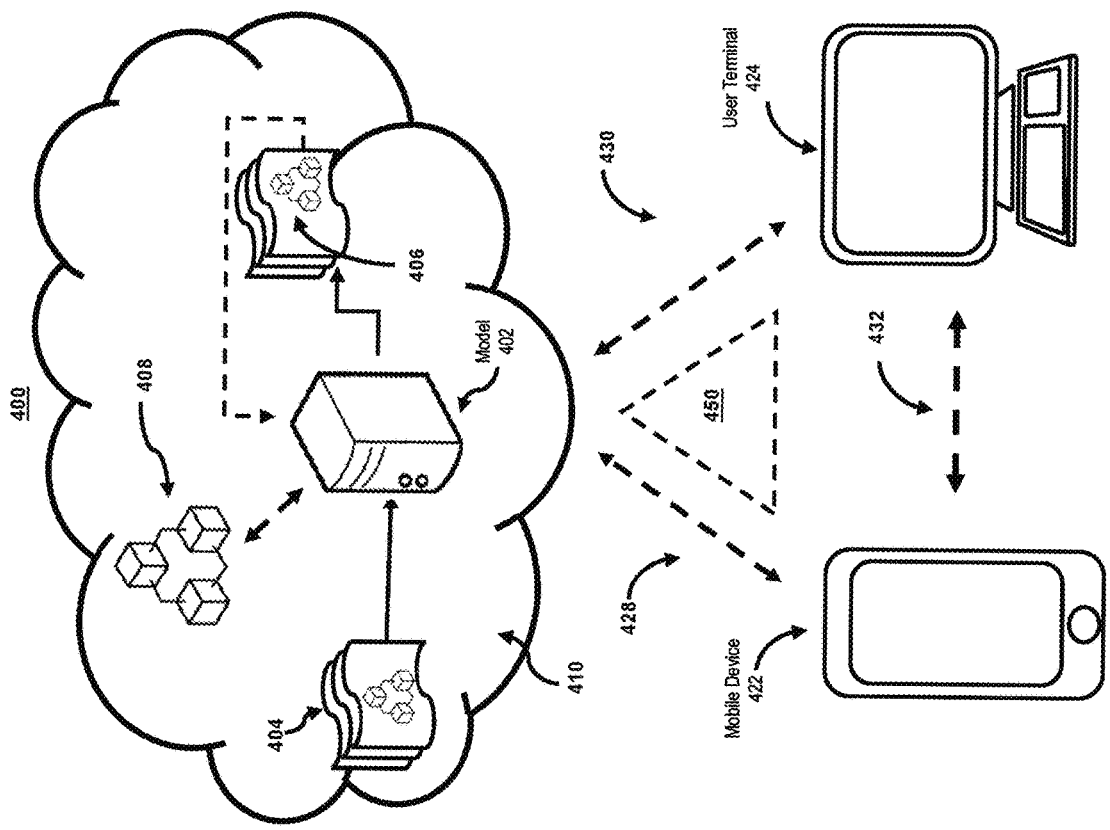
FIG. 4 shows illustrative components of a system for enabling modification of a digital asset associated with a unique cryptographic token, in accordance with one or more embodiments.

FIG. 4 shows illustrative components for a system used to receive an updated digital asset and transmit the updated digital asset to a management server to replace the digital asset linked by the unique cryptographic token, in accordance with one or more embodiments. For example, FIG. 4 may show illustrative components for allowing a third party to update a digital asset corresponding to a unique cryptographic token. As shown in FIG. 4, system 400 may include mobile device 422 and user terminal 424. While shown as a smartphone and personal computer, respectively, in FIG. 4, it should be noted that mobile device 422 and user terminal 424 may be any computing device, including, but not limited to, a laptop computer, a tablet computer, a handheld computer, and other computer equipment (e.g., a server), including "smart," wireless, wearable, and/or mobile devices. FIG. 4 also includes cloud components 410. Cloud components 410 may alternatively be any computing device as described above and may include any type of mobile terminal, fixed terminal, or other device. For example, cloud components 410 may be implemented as a cloud computing system and may feature one or more component devices. It should also be noted that system 400 is not limited to three devices. Users may, for instance, utilize one or more devices to interact with one another, one or more servers, or other components of system 400. It should be noted, that, while one or more operations are described herein as being performed by particular components of system 400, these operations may, in some embodiments, be performed by other components of system 400. As an example, while one or more operations are described herein as being performed by components of mobile device 422, these operations may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of mobile device 422, user terminal 424, and cloud components 410, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 4, both mobile device 422 and user terminal 424 include a display upon which to display data (e.g., conversational response, queries, and/or notifications).

Additionally, as mobile device 422 and user terminal 424 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 400 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communications networks or combinations of communications networks. Communication paths 428, 430, and 432 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may include access to a management server responsible for storing and modifying a digital asset (e.g., management server 106 (FIG. 1)). Cloud components 410 may include access to a third-party server responsible for making changes to a digital asset (e.g., third-party server 112 (FIG. 1)). Cloud components 410 may include a system server that is responsible for receiving requests from user devices (e.g., mobile device 422 or user terminal 424) and facilitating the receipt, modification, validation, and transmission of a digital asset (e.g., system server 108 (FIG. 1)).

Cloud components 410 may access blockchain network 408 (e.g., which in some embodiments may correspond to blockchain 308 (FIG. 3)). Additionally, cloud components 410 may access metadata associated with a unique cryptographic token included in blockchain network 408. Cloud components 410 may also access a digital asset stored on servers. Additionally, cloud components 410 may access modifications made to a digital asset.

Cloud components 410 may include model 402, which may be a machine learning model, artificial intelligence model, deep learning model, etc. (which may be referred to collectively as "models" herein). Model 402 may take inputs 404 and provide outputs 406. The inputs may include multiple datasets, such as a training dataset and a test dataset. Each of the plurality of datasets (e.g., inputs 404) may include data subsets related to user data, predicted forecasts and/or errors, and/or actual forecasts and/or errors. In some embodiments, outputs 406 may be fed back to model 402 as input to train model 402 (e.g., alone or in conjunction with user indications of the accuracy of outputs 406, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., predications for necessary modifications to a digital asset that are necessary in the event that the third-party server does not make accurate modifications according to validation step 216 in FIG. 2. Specifically, predictions could be corrections to typos, dates, or other information represented in the digital asset).

In a variety of embodiments, model 402 may update its configurations (e.g., weights, biases, or other parameters) based on the assessment of its prediction (e.g., outputs 406) and reference feedback information (e.g., user indication of accuracy, reference labels, or other information). In a variety of embodiments, where model 402 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, model 402 may be trained to generate better predictions.

In some embodiments, model 402 may include an artificial neural network. In such embodiments, model 402 may include an input layer and one or more hidden layers. Each neural unit of model 402 may be connected with many other neural units of model 402. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 402 may be self-learning and trained, rather than explicitly programmed, and can perform significantly better in certain areas of problem-solving, as compared to traditional computer programs. During training, an output layer of model 402 may correspond to a classification of model 402, and an input known to correspond to that classification may be input into an input layer of model 402 during training. During testing, an input without a known classification may be input into the input layer, and a determined classification may be output.

In some embodiments, model 402 may include multiple layers (e.g., where a signal path traverses from front layers to back layers). In some embodiments, backpropagation techniques may be utilized by model 402 where forward stimulation is used to reset weights on the "front" neural units. In some embodiments, stimulation and inhibition for model 402 may be more free-flowing, with connections interacting in a more chaotic and complex fashion. During testing, an output layer of model 402 may indicate whether or not a given input corresponds to a classification of model 402 (e.g., classifications may include errors that are made by the third-party server during modification. Classifications may include the type of error (e.g., logic error or syntax error)).

In some embodiments, the model (e.g., model 402) may automatically perform actions based on outputs 406. In some embodiments, the model (e.g., model 402) may not perform any actions. The output of the model (e.g., model 402) may be used to help correct errors in formatting or the modification of the digital asset by the third-party server.

System 400 also includes API layer 450. API layer 450 may allow the system to generate summaries across different devices. In some embodiments, API layer 450 may be implemented on mobile device 422 or user terminal 424. Alternatively or additionally, API layer 450 may reside on one or more of cloud components 410. API layer 450 (which may be a Representational State Transfer (REST) API or Web services API layer) may provide a decoupled interface to data and/or functionality of one or more applications. API layer 450 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) Web services have traditionally been adopted in the enterprise for publishing internal services, as well as for exchanging information with partners in B2B transactions.

API layer 450 may use various architectural arrangements. For example, system 400 may be partially based on API layer 450, such that there is strong adoption of SOAP and RESTful Web services, using resources like Service Repository and Developer Portal, but with low governance, standardization, and separation of concerns. Alternatively, system 400 may be fully based on API layer 450, such that separation of concerns between layers like API layer 450, services, and applications are in place.

In some embodiments, the system architecture may use a microservice approach. Such systems may use two types of layers: Front-end layer and back-end layer where microservices reside. In this kind of architecture, the role of the API layer 450 may provide integration between front end and back end. In such cases, API layer 450 may use RESTful APIs (exposition to front end or even communication between microservices). API layer 450 may use the Advanced Message Queuing Protocol (AMQP) (e.g., Kafka, RabbitMQ, etc.). API layer 450 may use incipient usage of new communications protocols such as gRPC, Thrift, etc.

In some embodiments, the system architecture may use an open API approach. In such cases, API layer 450 may use commercial or open source API Platforms and their modules. API layer 450 may use a developer portal. API layer 450 may use strong security constraints applying a Web Application Firewall (WAF) and Distributed Denial-of-Service (DDoS) protection, and API layer 450 may use RESTful APIs as standard for external integration.

Figure 5:
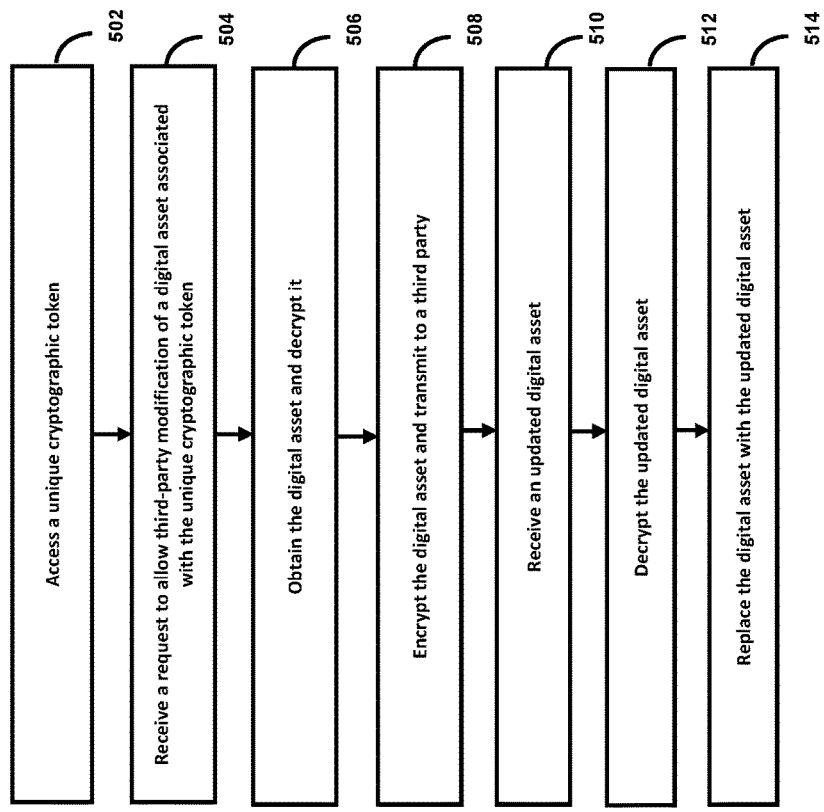
FIG. 5 shows a flowchart of the steps involved in enabling modification of a digital asset associated with a unique cryptographic token, in accordance with one or more embodiments.

FIG. 5 shows a flowchart of the steps involved in receiving an updated digital asset and transmitting the updated digital asset to a management server to replace the digital asset linked by the unique cryptographic token, in accordance with one or more embodiments. For example, the system may use process 500 (e.g., as implemented on one or more system components described above) in order to allow multiple parties to update the same unique cryptographic token which may be helpful in instances where the unique cryptographic token serves as an official dynamic record.

At step 502, process 500 (e.g., using one or more components described above) accesses a unique cryptographic token. For example, the system may receive a request from the user to allow a third-party server to modify the digital asset linked by the unique cryptographic token, wherein the request includes a public key for the third-party server. For example, the system may receive a request from the user to allow a third-party server to modify the digital asset linked by the unique cryptographic token if the digital asset may serve as an official dynamic record. An official dynamic record may be any official record that needs to be updated periodically (e.g., healthcare records, financial data, or employee data). An example of a digital asset may be a financial record that includes personally identifiable information (PII), income, expenses, assets, liabilities, credit reports, or other financial data. The digital asset may include medical records which could include PII, patient history, diagnoses, treatments, test results, doctor notes, or other healthcare-related information. The digital asset may include employment records that may include PII, employment history, current employment, education and training experience, performance evaluations, salary and benefits information, or other information correlated to employment, job responsibilities, or performance. The digital asset may include other personal records that may serve as an official dynamic record. By allowing requests from the user to modify digital assets, the system may allow a third party to update confidential records that pertain to the user for use in an official capacity as a type of official dynamic record.

In some embodiments, the system may verify the user device attempting to access the digital asset. For example, the system may receive, from a user device, a request to access the digital asset stored on a management server in an unencrypted format, wherein the request to access the digital asset comprises a provided unique cryptographic token identifier and a provided user identification number, verifying that a user identification number associated with the provided unique cryptographic token identifier is equivalent to the provided user identification number, and in response to verifying that the user identification number associated with the provided unique cryptographic token identifier is equivalent to the provided user identification number, transmitting the digital asset from the management server to the user device. For example, prior to viewing healthcare records stored in a digital asset, the system may validate the user of the user device to prevent unauthorized access to the healthcare records. By verifying the user device attempting to access the digital asset, the system may preserve data confidentiality and expand the use cases to include instances where confidential data is stored in the digital asset.

In some embodiments, the system may present a digital asset to a third-party server for inspection. For example, the system may receive a request from the third-party server to view the digital asset linked by the unique cryptographic token, transmit an approval request to a user device, determine that the user granted the approval request, decrypt the digital asset using the private key for the user, encrypt the digital asset with the public key of the third-party server, and transmit the digital asset to the third-party server. For example, a healthcare provider may want to add doctors' notes regarding a recent visit to an official dynamic health record. Prior to transmitting the digital asset, the system server may ping a user device requesting permission to release the dynamic health record to the healthcare provider to perform updates. If the user grants permission, the system server may transmit the official dynamic health record to the healthcare provider for modification. By presenting a digital asset to a third-party server for inspection, the system may ensure confidentiality is not compromised through a third-party request for modification.

In some embodiments, the system may present a confidential digital asset to a user device for inspection. For example, the system may receive a request from the user device to view the digital asset linked by the unique cryptographic token, transmit an approval request to the third-party server, determine that the third-party server granted the approval request, and transmit the digital asset to the user device. For example, if a user wants to review performance records stored in employment records pointed to by a unique cryptographic token, the user may request access to the employment records stored on the management server from a third-party server. If the third-party server grants permission, the system server may transmit the employment records to the user device with view-only access rights. By presenting a confidential digital asset to a user device for inspection, the system may allow a user to view but not modify data included in an official dynamic record which may be helpful in the accuracy of the record or in presenting the record (e.g., when applying for a new job).

In some embodiments, the system may present a non-confidential digital asset to a user device for inspection. For example, the system may receive a request from the user device to view the digital asset linked by the unique cryptographic token and transmit the digital asset to the user device. For example, the user may request to view employment history, which is non-confidential. The system may access the digital asset from the management server and transmit the employment history to the user device. By presenting a non-confidential digital asset to a user device for inspection, the system may ensure accessibility for the user.

At step 504, process 500 (e.g., using one or more components described above) receives a request to allow third-party modification of a digital asset associated with the unique cryptographic token. For example, the system may receive a request to allow third-party modification of a digital asset associated with the unique cryptographic token. For example, the system may receive a request from a new employer to update an employee record stored in a digital asset. By receiving a request to allow third-party modification of a digital asset associated with the unique cryptographic token, the system may control who modifies the digital asset and the frequency with which the digital asset is modified. Furthermore, by receiving a request to allow third-party modification of a digital asset, the user is not responsible for maintaining an updated digital asset.

At step 506, process 500 (e.g., using one or more components described above) obtains the digital asset and decrypts it. For example, the system may obtain the digital asset from the management server and decrypt the digital asset using a private key for the user. By obtaining the digital asset and decrypting it, the system may preserve the confidentiality of the digital asset.

At step 508, process 500 (e.g., using one or more components described above) encrypts the digital asset and transmits it to a third party. For example, the system may encrypt employment records using the third-party server's public key and transmit the digital asset to the third-party server. By encrypting the digital asset and transmitting it to a third party, the system may ensure that confidentiality and integrity are preserved while the digital asset is in transit.

At step 510, process 500 (e.g., using one or more components described above) receives an updated digital asset. For example, the system may receive, from the third-party server, an updated digital asset, wherein the digital asset has been encrypted using the public key for the user. For example, the system may receive updated health records after a user goes for an annual checkup appointment. By receiving an updated digital asset, the system may allow a digital asset to be used as an official dynamic record as third parties are able to update the digital asset.

At step 512, process 500 (e.g., using one or more components described above) decrypts the updated digital asset. For example, the system may decrypt the updated digital asset using the private key for the user. For example, the system may decrypt the health records to perform validation to ensure that the records are accurate and standardized for future reference. By decrypting the updated digital asset, the system may allow for data validation which improves data accuracy, ensures data standardization, and improves data security.

In some embodiments, the system may validate the updated digital asset. For example, the system may validate the updated digital asset with respect to a format for the digital asset. For example, the system may ensure that the formatting of the information modified by the third-party server is consistent with the system server by checking syntax (e.g., for standardized data such as social security numbers, and phone numbers), checking the range of integers (e.g., for known reasonable ranges such as age, or date), checking for completeness (e.g., ensuring that all form fields are filled), and checking for accuracy (e.g., ensuring that the data received from the third-party server is correct). By validating the updated digital asset, the system may reduce errors and confusion when modifying and viewing a digital asset. Minimizing errors and reducing confusion is especially important when the digital asset is serving as an official dynamic record.

At step 514, process 500 (e.g., using one or more components described above) replaces the digital asset with the updated digital asset. For example, the system may replace the digital asset associated with the unique cryptographic token with the updated digital asset. For example, after validating the modifications from the third-party server are accurate and in a standard format, the system may send the digital asset to the management server to replace the original digital asset. By replacing the digital asset with the updated digital asset, the system may ensure that the most up-to-date digital asset is pointed to by the unique cryptographic token associated with a user.

In some embodiments, the system may use an on-chain program to create a new unique cryptographic token. For example, the system may access an on-chain program associated with the unique cryptographic token and, based on the unique cryptographic token, generate a new unique cryptographic token and a new on-chain program associated with the new unique cryptographic token, wherein the new unique cryptographic token includes a link to the digital asset stored at a management server and render the unique cryptographic token invalid by associating the unique cryptographic token with an inaccessible address. For example, an ownership transfer may be necessary if the management server is no longer feasibly able to maintain the digital asset, and the blockchain is no longer feasibly able to store the unique cryptographic token, or if an individual is inheriting records (e.g., medical records of a deceased relative). By using an on-chain program to create a new unique cryptographic token, the system may allow more flexibility in storing, retrieving, and transmitting a digital asset. Specifically, by using an on-chain program to create a new unique cryptographic token, the system is not constrained to one blockchain, one management server, or one owner of the unique cryptographic token.

In some embodiments, the system may modify a digital asset in response to a data retention policy contained in an on-chain program. For example, the system may access an on-chain program comprising the data retention policy, wherein the on-chain program is associated with the unique cryptographic token, and wherein the on-chain program comprises a trigger, and in response to the trigger being activated, modifies the digital asset to remove one or more portions that violate the data retention policy. For example, if a data retention policy specifies that a portion of a digital asset should be inaccessible, the system server may request or perform a modification to the digital asset stored on the management server in accordance with a data retention policy for an on-chain program. For example, if the digital asset is employee records and if a data retention policy dictates that after a period of time performance reviews should be made inaccessible, the system server may, after the period of time elapses, inhibit access to the performance reviews in violation of the policy. The system server may inhibit access by blocking requests to access by deleting the record entirely. By modifying a digital asset in response to a data retention policy contained in an on-chain program, the system may allow a digital asset to follow data retention policies thereby increasing the use case for official dynamic records.

In some embodiments, the system may generate an on-chain program corresponding to a data retention policy. For example, the system may receive a data retention policy from the third-party server, generating an on-chain program, wherein the on-chain program comprises the data retention policy, wherein the on-chain program is associated with the unique cryptographic token, and wherein the on-chain program comprises a trigger, and in response to the trigger being activated, modifies the digital asset to remove one or more portions that violate the data retention policy. For example, the system may receive a data retention policy specifying that modification to a digital asset is required when a condition is met (e.g., deleting internal performance reviews once the user leaves the company). The system may generate an on-chain program that monitors the hash value of a field in the digital asset (e.g., "current employer") and when a change is detected (e.g., if the user switches employers) initiates a modification sequence that requires the system server to remove portions of the digital asset (e.g., information dictated by a retention policy). By generating an on-chain program corresponding to a data retention policy, the system may ensure that a digital asset serving as an official dynamic record complies with retention policies.

In some embodiments, the system may transfer ownership of the unique cryptographic token. For example, the system may input the unique cryptographic token into a smart contract on a first blockchain network, verifying the unique cryptographic token and digitally signing the unique cryptographic token, generating a second unique cryptographic token on a second blockchain network, wherein the second unique cryptographic token is a duplicate of the unique cryptographic token, and rendering the unique cryptographic token invalid by associating the unique cryptographic token with an inaccessible address. For example, if a blockchain is replaced by a better blockchain (e.g., fixing problems associated with environmental concerns or other blockchain-specific concerns) then the system may transfer ownership of the unique cryptographic token (the transfer of ownership may transfer the unique cryptographic token associated with the user to the same user on a different blockchain). By transferring ownership of the unique cryptographic token, the system may allow for additional futureproofing by reducing the likelihood that a blockchain being replaced, or that is less popular, is required to interface with a digital asset serving as an official dynamic record.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method for enabling modification of data associated with a unique cryptographic token, the method comprising accessing a unique cryptographic token associated with a user, wherein the unique cryptographic token includes a link to a digital asset stored at a management server, wherein the digital asset is encrypted using a public key for the user, receiving a request from the user to allow a third-party server to modify the digital asset linked by the unique cryptographic token, wherein the request includes a public key for the third-party server, obtaining the digital asset from the management server and decrypting the digital asset using a private key for the user, encrypting the digital asset using the public key for the third-party server, and transmitting the digital asset and the public key for the user to the third-party server, receiving, from the third-party server, an updated digital asset, wherein the digital asset has been encrypted using the public key for the user, decrypting the updated digital asset using the private key for the user and validating the updated digital asset with respect to a format for the digital asset, and in response to the validating being successful, transmitting the updated digital asset to the management server to replace the digital asset linked by the unique cryptographic token.

2. A method for enabling modification of a digital asset associated with a unique cryptographic token, the method comprising accessing a unique cryptographic token associated with a user, wherein the unique cryptographic token is associated with a digital asset, wherein the digital asset is encrypted using a public key for the user, receiving a request from the user to allow a third-party server to modify the digital asset associated with the unique cryptographic token, wherein the request includes a public key for the third-party server, obtaining the digital asset and decrypting the digital asset using a private key for the user, encrypting the digital asset using the public key for the third-party server and transmitting the digital asset and the public key for the user to the third-party server, receiving, from the third-party server, an updated digital asset, wherein the digital asset has been encrypted using the public key for the user, decrypting the updated digital asset using the private key for the user, and replacing the digital asset associated with the unique cryptographic token with the updated digital asset.

3. A method, the method comprising accessing a unique cryptographic token associated with a user, wherein the unique cryptographic token includes a link to a digital asset stored at a management server, wherein the digital asset is encrypted using a public key for the user, receiving a request from the user to allow a third-party server to modify the digital asset linked by the unique cryptographic token, wherein the request includes a public key for the third-party server, obtaining the digital asset from the management server and decrypting the digital asset using a private key for the user, encrypting the digital asset using the public key for the third-party server and transmitting the digital asset and the public key for the user to the third-party server, receiving, from the third-party server, an updated digital asset, wherein the digital asset has been encrypted using the public key for the user, decrypting the updated digital asset using the private key for the user, and transmitting the updated digital asset to the management server to replace the digital asset linked by the unique cryptographic token.

4. The method of any one of the preceding embodiments, further comprising validating the updated digital asset with respect to a format for the digital asset.

5. The method of any one of the preceding embodiments, further comprising accessing an on-chain program associated with the unique cryptographic token, based on the unique cryptographic token, generating a new unique cryptographic token and a new on-chain program associated with the new unique cryptographic token, wherein the new unique cryptographic token includes a link to the digital asset stored at a management server, and rendering the unique cryptographic token invalid by associating the unique cryptographic token with an inaccessible address.

6. The method of any one of the preceding embodiments, further comprising enforcing a data retention policy on the digital asset by accessing an on-chain program comprising the data retention policy, wherein the on-chain program is associated with the unique cryptographic token, and wherein the on-chain program comprises a trigger, and in response to the trigger being activated, modifying the digital asset to remove one or portions that violate the data retention policy.

7. The method of any one of the preceding embodiments, further comprising, receiving a data retention policy from the third-party server, generating an on-chain program, wherein the on-chain program comprises the data retention policy, wherein the on-chain program is associated with the unique cryptographic token, and wherein the on-chain program comprises a trigger, and in response to the trigger being activated, modifying the digital asset to remove one or portions that violate the data retention policy.

8. The method of any one of the preceding embodiments, further comprising inputting the unique cryptographic token into a smart contract on a first blockchain network, verifying the unique cryptographic token and digitally signing the unique cryptographic token, generating a second unique cryptographic token on a second blockchain network, wherein the second unique cryptographic token is a duplicate of the unique cryptographic token, and rendering the unique cryptographic token invalid by associating the unique cryptographic token with an inaccessible address.

9. The method of any one of the preceding embodiments, further comprising, receiving, from a user device, a request to access the digital asset stored on a management server in an unencrypted format, wherein the request to access the digital asset comprises a provided unique cryptographic token identifier and a provided user identification number, verifying that a user identification number associated with the provided unique cryptographic token identifier is equivalent to the provided user identification number, and in response to verifying that the user identification number associated with the provided unique cryptographic token identifier is equivalent to the provided user identification number, transmitting the digital asset from the management server to the user device.

10. The method of any one of the preceding embodiments, wherein the third-party server attempts to access the digital asset linked by the unique cryptographic token, and wherein the method further comprises, receiving a request from the third-party server to view the digital asset linked by the unique cryptographic token, transmitting an approval request to a user device, determining that the user granted the approval request, decrypting the digital asset using the private key for the user, encrypting the digital asset with the public key of the third-party server, and transmitting the digital asset to the third-party server.

11. The method of any one of the preceding embodiments, wherein a user device attempts to access the digital asset that is confidential, linked by the unique cryptographic token, and wherein the method further comprises, receiving a request from the user device to view the digital asset linked by the unique cryptographic token, transmitting an approval request to the third-party server, determining that the third-party server granted the approval request, and transmitting the digital asset to the user device.

12. The method of any one of the preceding embodiments, wherein a user device attempts to access the digital asset that is non-confidential, linked by the unique cryptographic token, and wherein the method further comprises, receiving a request from the user device to view the digital asset linked by the unique cryptographic token, and transmitting the digital asset to the user device.

13. A tangible, non-transitory, machine-readable medium storing instructions that, when executed by a data processing apparatus, cause the data processing apparatus to perform operations comprising those of any of embodiments 1-12.

14. A system comprising one or more processors; and memory storing instructions that, when executed by the processors, cause the processors to effectuate operations comprising those of any of embodiments 1-12.

15. A system comprising means for performing any of embodiments 1-12.

What is claimed is:

1. A system for enabling modification of data associated with a unique cryptographic token, comprising:
   one or more processors; and
   a non-transitory, computer-readable medium comprising instructions that, when executed by the one or more processors, cause operations comprising:
   accessing a unique cryptographic token associated with a user, wherein the unique cryptographic token includes a link to a digital asset stored at a management server, wherein the digital asset is encrypted using a public key for the user;
   receiving a request from the user to allow a third-party server to modify the digital asset linked by the unique cryptographic token, wherein the request includes a public key for the third-party server;
   obtaining the digital asset from the management server and decrypting the digital asset using a private key for the user;
   encrypting, to obtain an encrypted digital asset, the digital asset using the public key for the third-party server;
   transmitting the encrypted digital asset and the public key for the user to the third-party server;
   receiving, from the third-party server and after transmitting the encrypted digital asset to the third-party server, an updated digital asset that has been encrypted by the third-party server using the public key for the user;
   decrypting the updated digital asset using the private key for the user and validating the updated digital asset with respect to a format for the digital asset; and
   in response to the validating being successful and after receiving the updated digital asset from the third-party server, transmitting the updated digital asset to the management server to replace the digital asset linked by the unique cryptographic token.

2. A method for enabling modification of a digital asset associated with a unique cryptographic token, the method comprising:
   accessing a unique cryptographic token associated with a user, wherein the unique cryptographic token is associated with a digital asset stored at a management server, wherein the digital asset is encrypted using a public key for the user;
   receiving a request from the user to allow a third-party server to modify the digital asset associated with the unique cryptographic token, wherein the request includes a public key for the third-party server;
   obtaining the digital asset and decrypting the digital asset using a private key for the user;
   encrypting, to obtain an encrypted digital asset, the digital asset using the public key for the third-party server;
   transmitting the encrypted digital asset and the public key for the user to the third-party server;
   receiving, from the third-party server and after transmitting the encrypted digital asset to the third-party server, an updated digital asset that has been encrypted by the third-party server using the public key for the user;
   decrypting the updated digital asset using the private key for the user; and
   replacing the digital asset associated with the unique cryptographic token with the updated digital asset.

3. The method of claim 2, further comprising validating the updated digital asset with respect to a format for the digital asset.

4. The method of claim 2, further comprising:
   accessing an on-chain program associated with the unique cryptographic token;
   based on the unique cryptographic token, generating a new unique cryptographic token and a new on-chain program associated with the new unique cryptographic token, wherein the new unique cryptographic token includes a link to the digital asset stored at the management server; and
   rendering the unique cryptographic token invalid by associating the unique cryptographic token with an inaccessible address.

5. The method of claim 2, further comprising enforcing a data retention policy on the digital asset by:
   accessing an on-chain program comprising the data retention policy, wherein the on-chain program is associated with the unique cryptographic token, and wherein the on-chain program comprises a trigger; and
   in response to the trigger being activated, modifying the digital asset to remove one or portions that violate the data retention policy.

6. The method of claim 2, further comprising:
   receiving a data retention policy from the third-party server;
   generating an on-chain program, wherein the on-chain program comprises the data retention policy, wherein the on-chain program is associated with the unique cryptographic token, and wherein the on-chain program comprises a trigger; and in response to the trigger being activated, modifying the digital asset to remove one or portions that violate the data retention policy.

7. The method of claim 2, further comprising:

inputting the unique cryptographic token into a smart contract on a first blockchain network;

verifying the unique cryptographic token and digitally signing the unique cryptographic token;

generating a second unique cryptographic token on a second blockchain network, wherein the second unique cryptographic token is a duplicate of the unique cryptographic token; and rendering the unique cryptographic token invalid by associating the unique cryptographic token with an inaccessible address.

8. The method of claim 2, further comprising:

receiving, from a user device, a request to access the digital asset stored on a management server in an unencrypted format, wherein the request to access the digital asset comprises a provided unique cryptographic token identifier and a provided user identification number;

verifying that a user identification number associated with the provided unique cryptographic token identifier is equivalent to the provided user identification number; and in response to verifying that the user identification number associated with the provided unique cryptographic token identifier is equivalent to the provided user identification number, transmitting the digital asset from the management server to the user device.

9. The method of claim 2, wherein the third-party server attempts to access the digital asset linked by the unique cryptographic token, and wherein the method further comprises:

receiving a request from the third-party server to view the digital asset linked by the unique cryptographic token;

transmitting an approval request to a user device;

determining that the user granted the approval request;

decrypting the digital asset using the private key for the user;

encrypting the digital asset with the public key of the third-party server; and transmitting the digital asset to the third-party server.

10. The method of claim 2, wherein a user device attempts to access the digital asset that is confidential, linked by the unique cryptographic token, and wherein the method further comprises:

receiving a request from the user device to view the digital asset linked by the unique cryptographic token;

transmitting an approval request to the third-party server;

determining that the third-party server granted the approval request; and transmitting the digital asset to the user device.

11. The method of claim 2, wherein a user device attempts to access the digital asset that is non-confidential, linked by the unique cryptographic token, and wherein the method further comprises:

receiving a request from the user device to view the digital asset linked by the unique cryptographic token; and transmitting the digital asset to the user device.

12. A non-transitory, computer-readable medium having instructions recorded thereon, that, when executed by one or more processors, causes operations comprising:

accessing a unique cryptographic token associated with a user, wherein the unique cryptographic token includes a link to a digital asset stored at a management server, wherein the digital asset is encrypted using a public key for the user;

receiving a request from the user to allow a third-party server to modify the digital asset linked by the unique cryptographic token, wherein the request includes a public key for the third-party server;

obtaining the digital asset from the management server and decrypting the digital asset using a private key for the user;

encrypting, to obtain an encrypted digital asset, the digital asset using the public key for the third-party server;

transmitting the encrypted digital asset and the public key for the user to the third-party server;

receiving, from the third-party server and after transmitting the encrypted digital asset to the third-party server, an updated digital asset that has been encrypted by the third-party server using the public key for the user;

decrypting the updated digital asset using the private key for the user; and transmitting the updated digital asset to the management server to replace the digital asset linked by the unique cryptographic token.

13. The non-transitory, computer-readable medium of claim 12, the operations further comprising:

accessing an on-chain program associated with the unique cryptographic token;

based on the unique cryptographic token, generating a new unique cryptographic token and a new on-chain program associated with the new unique cryptographic token, wherein the new unique cryptographic token includes a link to the digital asset stored at the management server; and rendering the unique cryptographic token invalid by associating the unique cryptographic token with an inaccessible address.

14. The non-transitory, computer-readable medium of claim 12, the operations further comprising enforcing a data retention policy on the digital asset by:

accessing an on-chain program comprising the data retention policy, wherein the on-chain program is associated with the unique cryptographic token, and wherein the on-chain program comprises a trigger; and in response to the trigger being activated, modifying the digital asset to remove one or portions that violate the data retention policy.

15. The non-transitory, computer-readable medium of claim 12, the operations further comprising:

receiving a data retention policy from the third-party server;

generating an on-chain program, wherein the on-chain program comprises the data retention policy, wherein the on-chain program is associated with the unique cryptographic token, and wherein the on-chain program comprises a trigger; and in response to the trigger being activated, modifying the digital asset to remove one or portions that violate the data retention policy.

16. The non-transitory, computer-readable medium of claim 12, the operations further comprising:

inputting the unique cryptographic token into a smart contract on a first blockchain network;

verifying the unique cryptographic token and digitally signing the unique cryptographic token;

generating a second unique cryptographic token on a second blockchain network, wherein the second unique cryptographic token is a duplicate of the unique cryptographic token; and rendering the unique cryptographic token invalid by associating the unique cryptographic token with an inaccessible address.

17. The non-transitory, computer-readable medium of claim 12, the operations further comprising:

receiving, from a user device, a request to access the digital asset stored on a management server in an unencrypted format, wherein the request to access the digital asset comprises a provided unique cryptographic token identifier and a provided user identification number;

verifying that a user identification number associated with the provided unique cryptographic token identifier is equivalent to the provided user identification number; and in response to verifying that the user identification number associated with the provided unique cryptographic token identifier is equivalent to the provided user identification number, transmitting the digital asset from the management server to the user device.

18. The non-transitory, computer-readable medium of claim 12, wherein the third-party server attempts to access the digital asset linked by the unique cryptographic token, and wherein the operations further comprise:

receiving a request from the third-party server to view the digital asset linked by the unique cryptographic token;

transmitting an approval request to a user device;

determining that the user granted the approval request;

decrypting the digital asset using the private key for the user;

encrypting the digital asset with the public key of the third-party server; and transmitting the digital asset to the third-party server.

19. The non-transitory, computer-readable medium of claim 12, wherein a user device attempts to access the digital asset that is confidential, linked by the unique cryptographic token, and wherein the operations further comprise:

receiving a request from the user device to view the digital asset linked by the unique cryptographic token;

transmitting an approval request to the third-party server;

determining that the third-party server granted the approval request; and transmitting the digital asset to the user device.

20. The non-transitory, computer-readable medium of claim 12, wherein a user device attempts to access the digital asset that is non-confidential, linked by the unique cryptographic token, and wherein the operations further comprise:

receiving a request from the user device to view the digital asset linked by the unique cryptographic token; and transmitting the digital asset to the user device.

* * * * *